US012474036B2

(12) United States Patent
Gillespie

(10) Patent No.: US 12,474,036 B2
(45) Date of Patent: Nov. 18, 2025

(54) ADJUSTABLE WORK LIGHT

(71) Applicant: Mark Gillespie, Delmont, PA (US)

(72) Inventor: Mark Gillespie, Delmont, PA (US)

(73) Assignee: Mark Gillespie, Delmont, PA (US)

( * ) Notice: Subject to any disclaimer, the term of this patent is extended or adjusted under 35 U.S.C. 154(b) by 0 days.

(21) Appl. No.: 18/854,566

(22) PCT Filed: Apr. 13, 2023

(86) PCT No.: PCT/US2023/018456
§ 371 (c)(1),
(2) Date: Oct. 7, 2024

(87) PCT Pub. No.: WO2023/200927
PCT Pub. Date: Oct. 19, 2023

(65) Prior Publication Data

US 2025/0224101 A1 Jul. 10, 2025

Related U.S. Application Data

(60) Provisional application No. 63/331,052, filed on Apr. 14, 2022.

(51) Int. Cl.

| | |
|---|---|
| ***F21V 21/14*** | (2006.01) |
| ***F21L 14/00*** | (2006.01) |
| ***F21S 4/22*** | (2016.01) |
| ***F21V 21/088*** | (2006.01) |
| ***F21V 21/096*** | (2006.01) |
| ***F21V 21/32*** | (2006.01) |
| ***F21Y 115/10*** | (2016.01) |

(52) U.S. Cl.
CPC ............ *F21V 21/145* (2013.01); *F21L 14/00* (2013.01); *F21S 4/22* (2016.01); *F21V 21/0885* (2013.01); *F21V 21/0965* (2013.01); *F21V 21/32* (2013.01); *F21Y 2115/10* (2016.08)

(58) Field of Classification Search
CPC .... F21V 21/145; F21V 21/0885; F21V 21/32; F21V 21/0965; F21S 4/22; F21L 14/00; F21L 14/023; F21L 14/026; B60Q 1/326
USPC ........................................ 362/249.03, 249.08
See application file for complete search history.

(56) References Cited

U.S. PATENT DOCUMENTS

| | | | | |
|---|---|---|---|---|
| 4,197,573 A * | 4/1980 | Thatch | ................ F21V 21/0885 362/396 |
| 2005/0162850 A1 | 7/2005 | Luk et al. | |
| 2009/0303739 A1 | 12/2009 | Garcia | |
| 2011/0297970 A1 | 12/2011 | Lo et al. | |

(Continued)

FOREIGN PATENT DOCUMENTS

| | | |
|---|---|---|
| EP | 2581649 A1 | 4/2013 |
| EP | 2998642 A2 | 3/2016 |

OTHER PUBLICATIONS

Machine translate EP2998642A2 (Mar. 23, 2016) (Year: 2016).*

*Primary Examiner* — Laura K Tso
(74) *Attorney, Agent, or Firm* — The Webb Law Firm

(57) ABSTRACT

Provided is an adjustable work light having a support having a length, a plurality of lights located along the length, at least one attachment mechanism connected to the support and being configured to arrange the support in a desired position. The support may be adjustable along the length, and the plurality of lights may be individually adjustable.

20 Claims, 6 Drawing Sheets

(56) References Cited

U.S. PATENT DOCUMENTS

| | | | | |
|---|---|---|---|---|
| 2014/0340903 | A1 | 11/2014 | Mahr | |
| 2019/0249851 | A1 * | 8/2019 | Ericson, Jr. ............ | H05B 45/48 |

* cited by examiner

ADJUSTABLE WORK LIGHT

CROSS REFERENCE TO RELATED APPLICATIONS

This application is the United States national phase of International Patent Application No. PCT/US23/18456 filed Apr. 13, 2023, and claims priority to U.S. Provisional Patent Application No. 63/331,052, filed on Apr. 14, 2022, the disclosures of which are hereby incorporated by reference in their entireties.

BACKGROUND

1. Technical Field

Disclosed non-limiting embodiments or aspects relate generally to work lights, and in one some non-limiting embodiments or aspects, to adjustable, portable, and mountable work lights for use in a variety of applications.

2. Technical Background

Different work environments, such as automobiles, construction, property management, and laboratories, have different lighting requirements. Supplying the right amount of light in these environments at the most effective angles is difficult and sometimes impossible. Often times, common portable light sources, like flashlights, are not bright enough or cannot be adjusted to illuminate awkwardly shaped spaces. Single-point flashlights may not provide enough light to focus on multiple areas of illumination, and handheld flashlights reduce the dexterity and mobility of a user. Certain work environments, such as the interior of an automobile engine hood, may not present a viable placement surface for setting down known work lights. Moreover, one type of portable light source may be sufficient in one application but wholly insufficient in another. Therefore, there is a need for a bright, portable, and adjustable work light that can focus multiple points of light at varying intensities across various work spaces, and that is adaptable for placement in various types of work environments.

SUMMARY

According to some non-limiting embodiments or aspects, provided is an adjustable work light that overcomes one or more of the deficiencies described above.

According to some non-limiting embodiments or aspects, provided is an adjustable work light. The adjustable work light includes a support having a length. The adjustable work light also includes a plurality of lights located along the length. The adjustable work length further includes at least one attachment mechanism connected to the support. The at least one attachment mechanism is configured to arrange the support in a desired position. The support is adjustable along the length, and the plurality of lights are individually adjustable. The support is bendable at a plurality of points along the length. The support is configured to extend and contract at a plurality of points along the length. The plurality of lights are rotatable about the support. The plurality of lights are configured to extend a distance away from the support. The brightness of the plurality of work lights is adjustable.

In some non-limiting embodiments or aspects, the at least one attachment mechanism may include a first attachment mechanism located at a first end of the support and a second attachment mechanism located at a second end of the support, opposite the first end. The at least one attachment mechanism may include a third attachment mechanism located between the first attachment mechanism and the second attachment mechanism. The first attachment mechanism and the second attachment mechanism may be clamps. The third attachment mechanism may be a hook. The flexible support may be a tube having a hollow interior. The adjustable work light may include a power cord extending through the hollow interior and configured to provide power to the plurality of lights. The power cord may include a plug end configured to draw power from an outside source. The tube may include a body defining the hollow interior and a plurality of rings extending from the body equidistant along the length. The body may be configured to expand and contract between each of the plurality of rings. The plurality of lights may be received within the tube. The tube may include a plurality of portions, each portion corresponding to one of the plurality of work lights. Each of the plurality of portions may be configured to bend relative to the other plurality of portions.

According to some non-limiting embodiments or aspects, provided is an adjustable work light including a flexible support tube. The adjustable work light also includes a plurality of lights disposed along a length of the flexible support tube. The adjustable work light further includes a first attachment mechanism arranged at a first end of the flexible support tube, and a second attachment mechanism arranged at a second end of the flexible support tube, opposite the first end. The length of the flexible support tube is adjustable along a plurality of points, and the plurality of lights are individually adjustable relative to the flexible support tube and each of the other plurality of lights. The flexible support tube defines a hollow interior configured to receive a power cord therein, and the power cord is configured to provide power from an outside source to the plurality of lights. A third attachment mechanism is located between the first attachment mechanism and the second attachment mechanism. The flexible support tube includes corrugated stainless steel tubing.

In some non-limiting embodiments or aspects, the present disclosure may be characterized by one or more of the following numbered clauses:

Clause 1: An adjustable work light comprising: a support having a length; a plurality of lights located along the length; at least one attachment mechanism connected to the support, the at least one attachment mechanism configured to arrange the support in a desired position, wherein the support is adjustable along the length, and wherein the plurality of lights are individually adjustable.

Clause 2: The adjustable work light of clause 1, wherein the support is bendable at a plurality of points along the length.

Clause 3: The adjustable work light of clause 1 or clause 2, wherein the support is configured to extend and contract at a plurality of points along the length.

Clause 4: The adjustable work light of any of clauses 1-3, wherein the plurality of lights are rotatable about the support.

Clause 5: The adjustable work light of any of clauses 1-4, wherein the plurality of lights are configured to extend a distance away from the support.

Clause 6: The adjustable work light of any of clauses 1-5, wherein the brightness of the plurality of work lights is adjustable.

Clause 7: The adjustable work light of any of clauses 1-6, wherein the at least one attachment mechanism comprises a first attachment mechanism located at a first end of the support and a second attachment mechanism located at a second end of the support, opposite the first end.

Clause 8: The adjustable work light of any of clauses 1-7, wherein the at least one attachment mechanism comprises a third attachment mechanism located between the first attachment mechanism and the second attachment mechanism.

Clause 9: The adjustable work light of any of clauses 1-8, wherein the first attachment mechanism and the second attachment mechanism are clamps.

Clause 10: The adjustable work light of any of clauses 1-9, wherein the third attachment mechanism is a hook.

Clause 11: The adjustable work light of any of clauses 1-10, wherein the flexible support is a tube comprising a hollow interior.

Clause 12: The adjustable work light of any of clauses 1-11, wherein the adjustable work light further comprises a power cord extending through the hollow interior and configured to provide power to the plurality of lights.

Clause 13: The adjustable work light of any of clauses 1-12, wherein the power cord comprises a plug end configured to draw power from an outside source.

Clause 14: The adjustable work light of any of clauses 1-13, wherein the tube comprises a body defining the hollow interior and a plurality of rings extending from the body equidistant along the length, and wherein the body is configured to bend between each of the plurality of rings Clause 15: The adjustable work light of any of clauses 1-14, wherein the plurality of lights are received within the tube.

Clause 16: The adjustable work light of any of clauses 1-15, wherein the tube comprises a plurality of portions, each portion corresponding to one of the plurality of work lights, and wherein each of the plurality of portions of the tube are configured to bend relative to the other plurality of portions.

Clause 17: An adjustable work light comprising: a flexible support tube; a plurality of lights disposed along a length of the flexible support tube; a first attachment mechanism arranged at a first end of the flexible support tube; and a second attachment mechanism arranged at a second end of the flexible support tube, opposite the first end, wherein the length of the flexible support tube is adjustable along a plurality of points, and wherein the plurality of lights are individually adjustable relative to the flexible support tube and each of the other plurality of lights.

Clause 18: The adjustable work light of clause 17, wherein the flexible support tube defines a hollow interior configured to receive a power cord therein, the power cord being configured to provide power from an outside source to the plurality of lights.

Clause 19: The adjustable work light of clause 17 or clause 18, further comprising a third attachment mechanism between the first attachment mechanism and the second attachment mechanism.

Clause 20: The adjustable work light of any of clauses 17-19, wherein the flexible support tube comprises corrugated stainless steel tubing.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments that are illustrated in the accompanying figures, in which.

DETAILED DESCRIPTION

Figure 1:
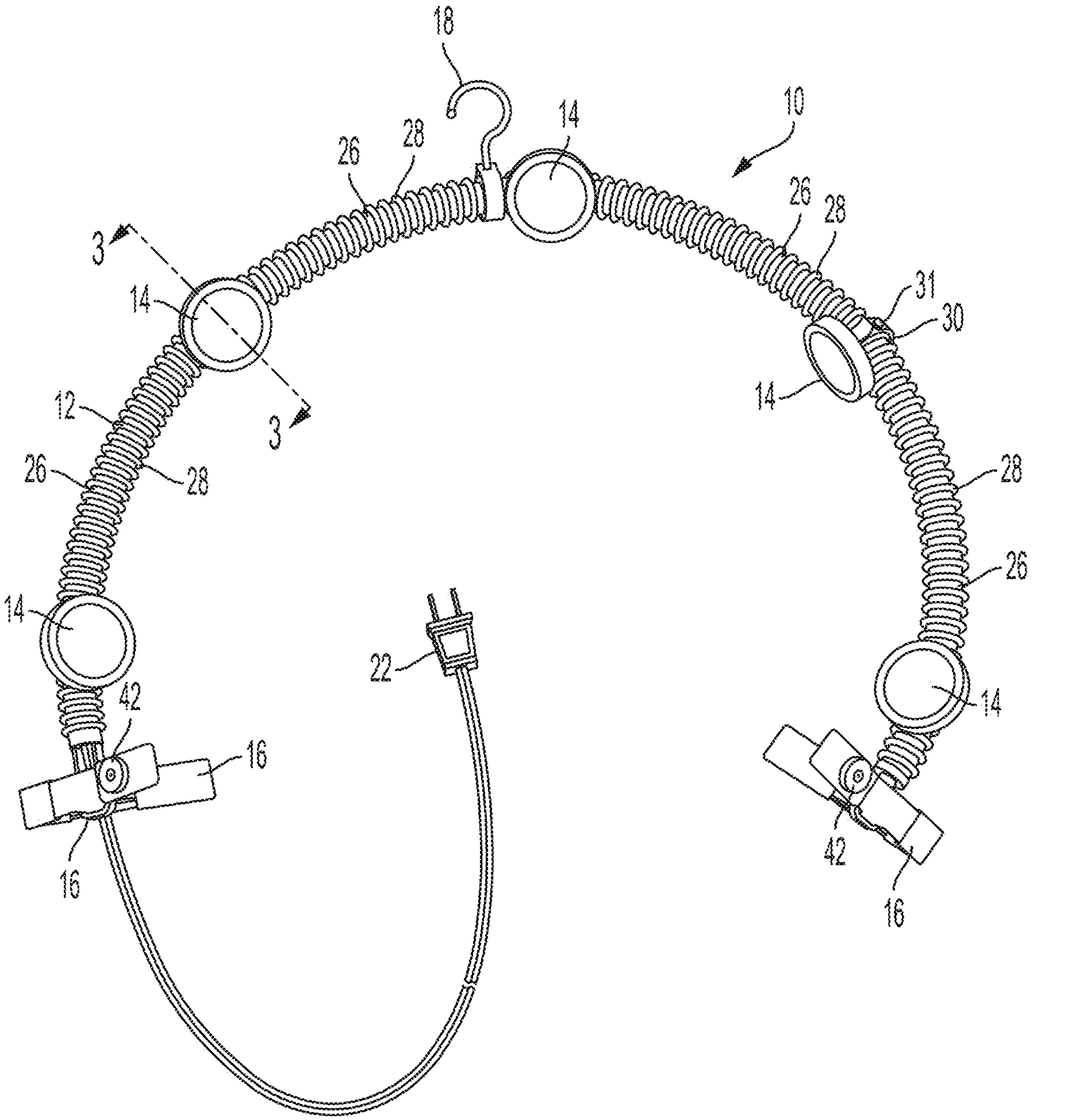
FIG. 1 shows a perspective view of an adjustable work light according to one embodiment or aspect of the present disclosure.

For purposes of the description hereinafter, the terms "upper", "lower", "right", "left", "vertical", "horizontal", "top", "bottom", "lateral", "longitudinal," and derivatives thereof shall relate to non-limiting embodiments or aspects as they are oriented in the drawing figures. However, it is to be understood that non-limiting embodiments or aspects may assume various alternative variations, except where expressly specified to the contrary. It is also to be understood that the specific devices illustrated in the attached drawings, and described in the following specification, are simply exemplary embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. The terms "first", "second", and the like are not intended to refer to any particular order or chronology, but refer to different conditions, properties, or elements. The term "at least" is synonymous with "greater than or equal to."

Figure 2A:
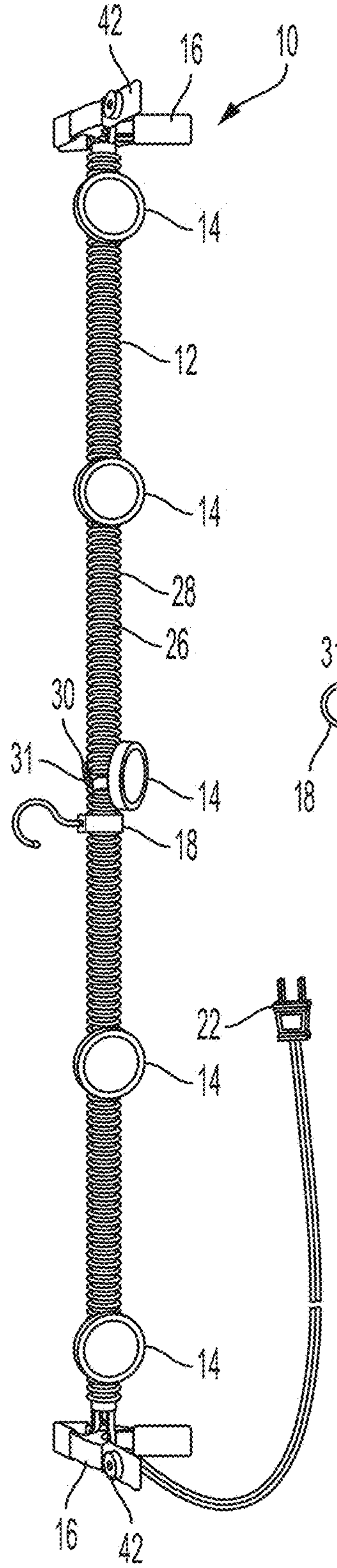
FIG. 2A is a side view showing the adjustable work light of FIG. 1 in a one arrangement.
Figure 2B:
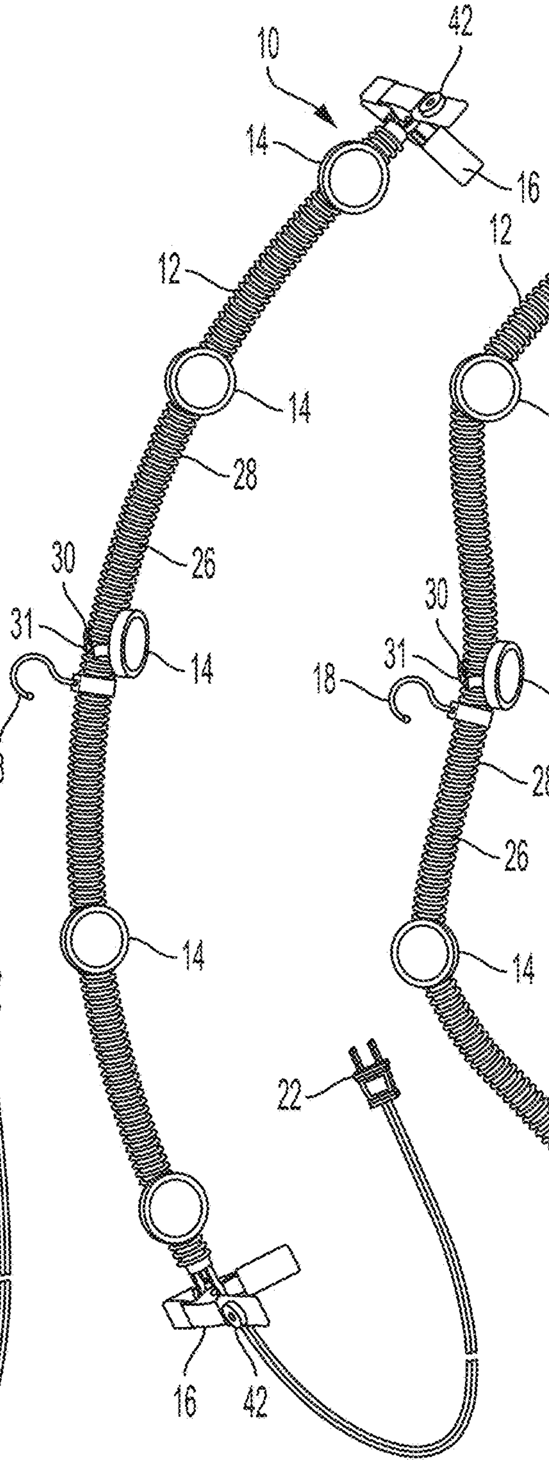
FIG. 2B is a side view showing the adjustable work light of FIG. 1 in another arrangement.
Figure 2C:
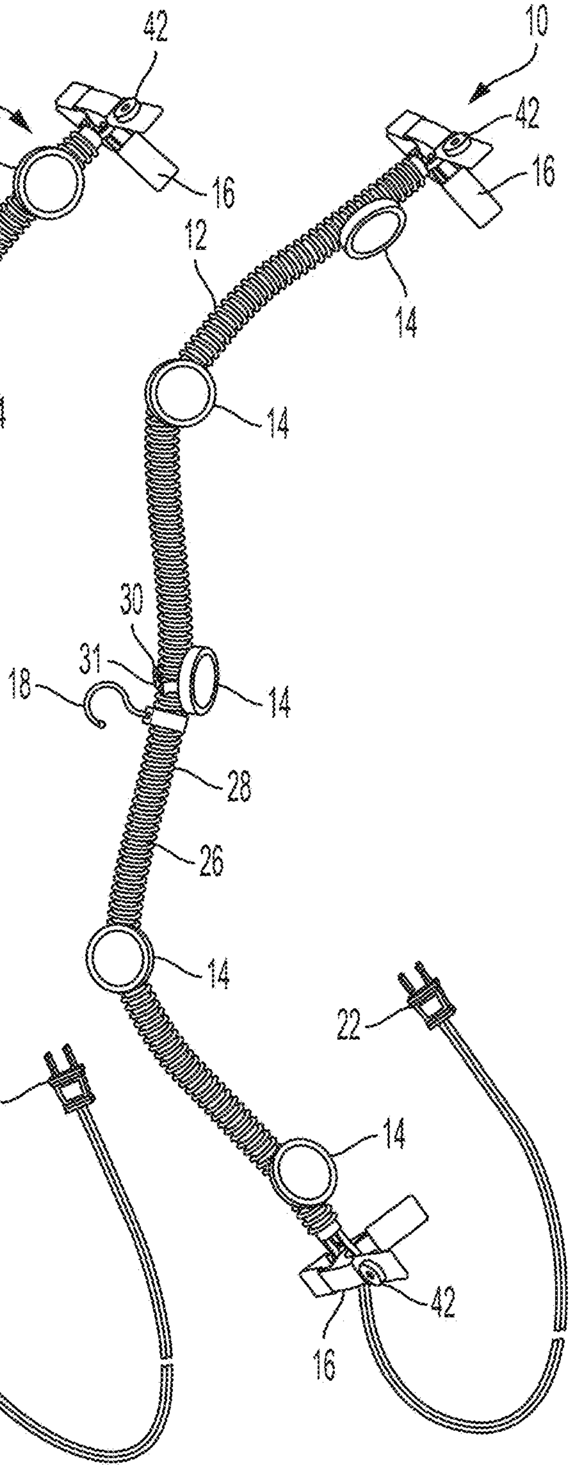
FIG. 2C is a side view showing the adjustable work light of FIG. 1 in another arrangement.
Figure 3:
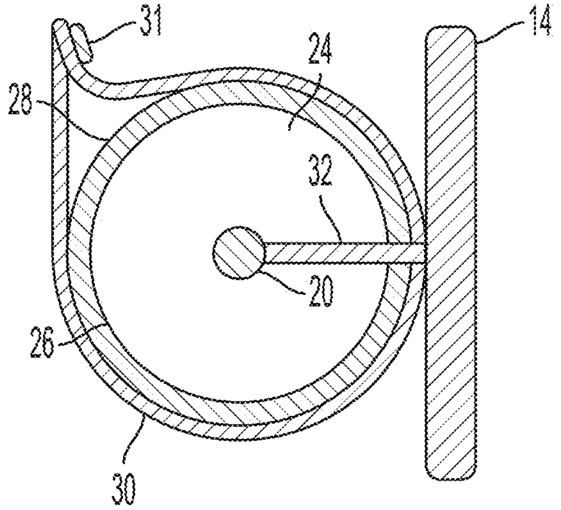
FIG. 3 is a cross sectional view of the adjustable work light shown in FIG. 1 taken along the line I-I.

With reference to FIGS. 1-6, depicted is an adjustable work light 10 according to non-limiting embodiments or aspects of the present disclosure. While multiple non-limiting embodiments or aspects of different features described in this disclosure are shown in the drawings, for clarity, only some of those features shown are identified by reference numbers. Adjustable work light 10 includes flexible support 12 (e.g., a plastic hollow tube, a bendable bar, corrugated pipe, etc.) with lights 14 (e.g., light emitting diodes (LED), etc.) disposed along length L of support 12. Two attachment mechanisms 16 (e.g., clamps, clips, magnets, ties, hooks etc.) are arranged at opposing ends of flexible support 12, with third attachment mechanism 18 (e.g., clamps, clips, magnets, ties, hooks, etc.) arranged in approximately the middle of support 12, between the other attachment mechanisms 16. Each of attachment mechanism 16, 18 is designed to support adjustable work light 10 in a variety of different work environments (e.g., motor vehicle repair, home repair, laboratories, factories, mills, construction sites, etc.), as will be described below. To supply lights 14 with power, power cord 20 and plug 22 are provided, with power cord 20 extending into hollow interior 24 defined in flexible support 12. FIG. 3 shows the connection between power cord 20 and each light 14 via hollow interior 24 of the flexible support 12. Although power cord 20 and plug 22 are shown, batteries (e.g., onboard rechargeable power cell, battery pack for replaceable battery cells, etc.) or other portable power sources can be used to supply power to lights 14. In such an example, the plug 22 may be excluded from adjustable work light 10, and power cord 20 may be contained entirely within hollow interior 24 interconnecting one or more batteries with lights 14. In non-limiting embodiments or aspects, configurations including power cord 20 and plug 22 provide the advantage of a continuous power source to adjustable work light 10, while configurations including power cord 20 and one or more batteries provide the advantage of increased portability and sealed integrity (e.g., against water, weather, etc.) of adjustable work light 10.

With continued reference to FIGS. 1-6, flexible support 12 will now be described. As shown, flexible support 12 is an elongated tube, but other shapes (e.g., elongated containers having one or more sides, shaped such as square prisms, triangular prisms, octagonal prisms, etc.) can also be used. Flexible support 12 may be made of a material that allows flexible support 12, or at least portions of support 12, to deformably and reformably bend, twist, extend, and contract. In some embodiments, the flexible support 12 may only bend at certain points, without the ability to twist, extend, and contract. Such materials for the flexible support 12 may include, but are not limited to, PVC plastic, rubber, and corrugated stainless steel tubing. Such capabilities allow for a user to modify the positions of lights 14 by rotating, twisting, stretching, bending, etc., support 12.

With specific reference to FIGS. 2A-2C, FIGS. 2A-2C depict non-limiting embodiments or aspects of flexible support 12 of adjustable work light 10 arranged in different positions. FIG. 2A shows flexible support 12 arranged in a substantially straight line, which may be advantageous to maximizing illumination along a linear work space (e.g., laboratory bench). FIG. 2B shows flexible support 12 arranged in an arched shape, with one light 14 near a peak of the arc, which may be advantageous to provide focal illumination toward a point within a concave arc of flexible support 12 (e.g., for a work environment within an enclosed space, such as an automobile engine block), or may be advantageous to provide spreading illumination away from a convex arc of flexible support 12 (e.g., for a work environment extending around and above work light 10, such as in a room that is being painted, built, etc.). FIG. 2C shows flexible support 12 arranged to be bent and curved in multiple locations, which may be advantageous for fastening work light 10 to an uneven attachment surface (e.g., the inside of an automobile engine hood, among scaffolding, around workspace shelving, etc.).

Figure 5:
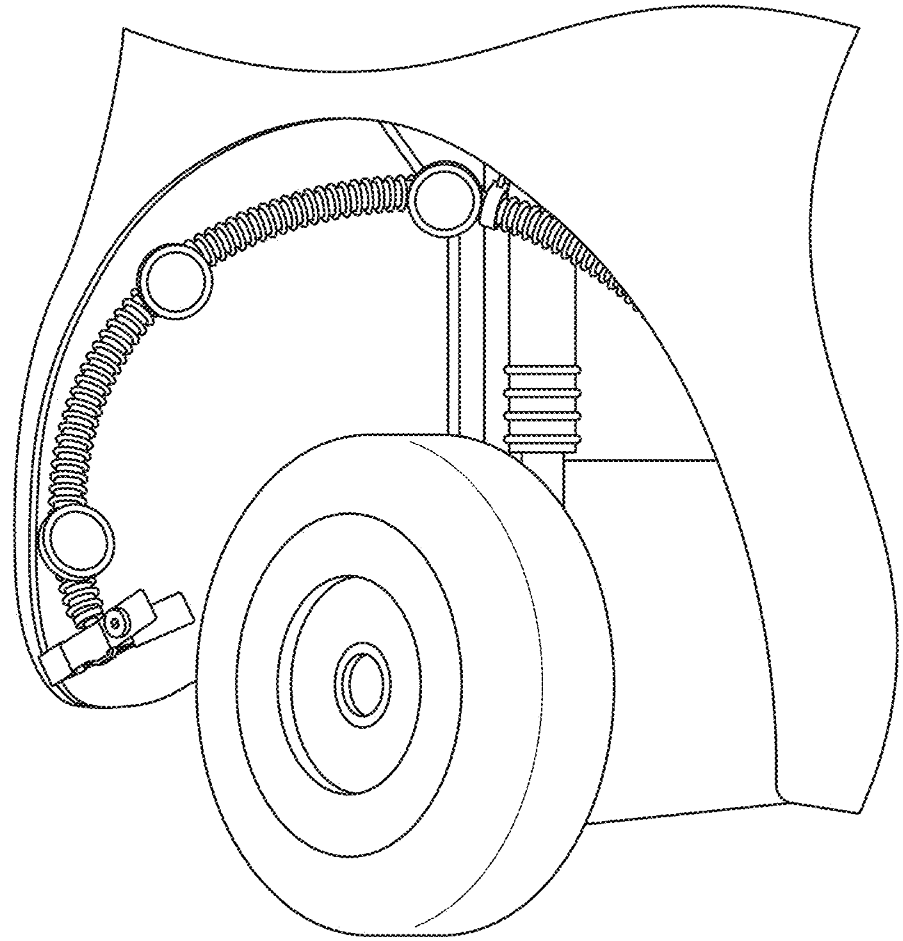
FIG. 5 shows the adjustable work light of FIG. 1 arranged within a wheel well of a motor vehicle.
Figure 6:
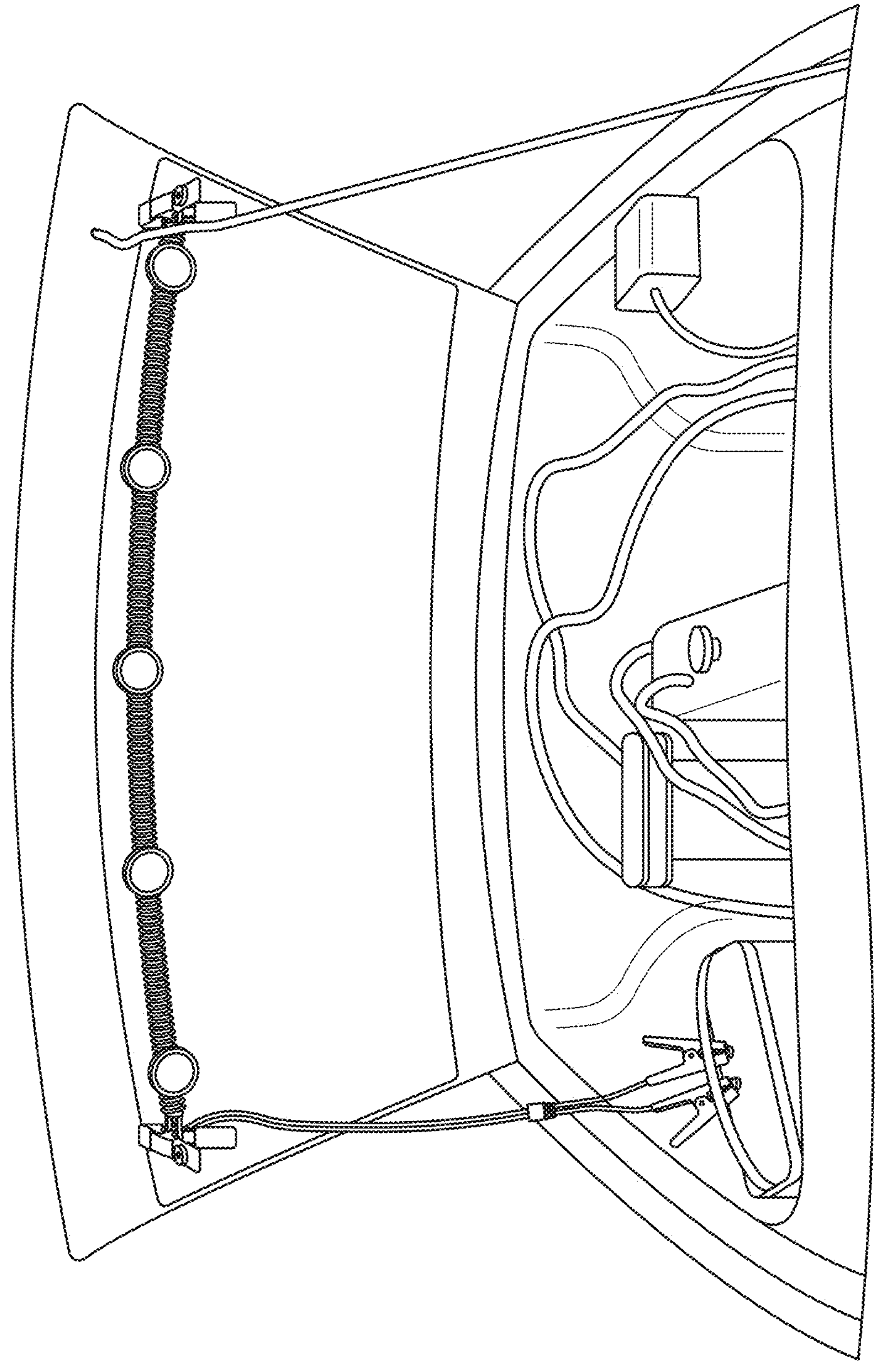
FIG. 6 shows the adjustable work light of FIG. 1 arranged under the hood of a car.

With specific reference to FIGS. 5 and 6, FIGS. 5 and 6 depict non-limiting embodiments or aspects of work light 10 in different conditions of use, which require flexible support 12 to be bent into different shapes. For example, depending on the different conditions in which work light 10 may be used, it may be desirable for flexible support 12 to extend or contract so that light generated by lights 14 can cover a greater area or be concentrated over a lesser area. To achieve this, flexible support 12 may have a body 26 that is made of material that is capable of extension and/or compression. Flexible support 12 may also include rings 28 that are spaced apart along body 26, so that the portions of body 26 located between adjacent rings can bend in on itself (e.g., modularly collapse, acting as an compressing accordion, etc.), thereby compressing flexible support 12 so that work light 10 extends along a shorter distance, which may be advantageous in accommodating smaller work environments. These same portions of the body 26 may also be stretched (e.g., modularly expanded, acting as an expanding accordion, etc.), so that the flexible support 12 can increase in length, thereby covering a longer distance, which may be advantageous in accommodating larger work environments. This same arrangement allows flexible support 12 to deform along the length of flexible support 12, so that body 26 can be curved or bent in various directions at various points along the length, wherein the portions of body 26 may inwardly bend (e.g., partially collapse) to angle body 26 in a direction of the bending.

The flexible support 12 may also be bent along the body 26 in between the rings 28, so that the flexible support may take different shapes such as those shown in FIGS. 2A-2C. Depending on how the flexible support 12 is bent, the work light 10 may be rolled into certain spaces that would have been difficult or unable to be reached had the support 12 maintained a substantially straight length.

With specific reference to FIGS. 1-6, depicted are non-limiting embodiments or aspects of lights 14 of work light 10. Multiple lights 14 are disposed along the length of flexible support 12. While only five lights 14 are shown, it is understood that any number of lights can be provided along the flexible support 12 and function in the same manner as described herein. For example, as few as one light 14 may be employed on flexible support 12, to minimize overcasting illumination and provide single-point lighting, for work environments that require a low amount of concentrated illumination (e.g., detailed part work on a private work bench). By way of another example, five or more lights 14 may be provided to increase overall illumination and provide multi-point lighting, for work environments and applications that require a high amount of light (e.g., a room that is being painted, built, etc.). It will also be appreciated that by increasing the number of lights 14, work light 10 can eliminate or minimize shadows present in a work environment. Different work areas in a single space may also be illuminated by the different lights 14. As shown, lights 14 are attached to an outer surface of the flexible support 12 via a fastening mechanism 30 (e.g., zip ties, clamps, ties, clips, magnets, etc.). Fastening mechanism 30 has a surface connected to or is formed integrally with lights 14, so that fastening mechanism 30 wraps around flexible support 12, thereby securing lights 14. The fastening mechanism 30 includes a connecting mechanism 31 (e.g. buttons, magnets, ties, clips, etc.) to fix the fastening mechanism 30 and the light 14 about the flexible support 12. This arrangement allows lights 14 to be rotated about flexible support 12 via the fastening mechanism 30, which permits a user to manipulate lights 14 in a desired manner. Fastening mechanisms 30 may also have extensions (e.g., an excess piece of material or fabric, a cord, plastic tube, flexible bar, etc.), which arrange lights 14 some distance away from flexible support 12. This permits lights 14 to be bent or angled relative to flexible support 12, giving the user more control over the placement of lights 14.

In some non-limiting embodiments or aspects, a back surface of lights 14 may be connected to flexible support 12 via glue, tape, or another adhesive. In some non-limiting embodiments or aspects, lights 14 may be embedded within flexible support 12 (e.g., at least partially housed within an interior of flexible support 12 and having an illuminating surface substantially in alignment with an outer surface of flexible support 12). In some non-limiting embodiments or aspects, flexible support 12 may have a number of holes (not shown) provided therein, which permit a corresponding number of lights 14 to be placed and secured within holes. The holes are large enough to support at least a portion of the lights 14 therein, thereby securing the lights 14 to the holes to some degree. Lights 14 may be further connected to the holes via an adhesive and/or a may be mounted into the holes using a central rod attached to each light 14, which may extend into hollow interior 24 of flexible support 12. In some non-limiting embodiments or aspects, it is contemplated that lights 14 may partially extend from flexible support 12 or have a surface that is flush with support 12. It is further contemplated that flexible support 12 may include different portions that are able to twist relative to other portions of support 12. Relative flexibility permits different lights 14 to be angled and aimed in different directions.

Each light 14 may be individually focusable (e.g., configured to modify a cone, arc, or spread of light emitting from light 14) and adjustable (e.g., configured to modify an angle at which light emits from light 14). The intensity of each light 14 can be set to a desired level (e.g., by turning a knob connected to the light 14 or by a touch-sensitive sensor). The spread of the projected field of light 14 can be widened or narrowed (e.g., by turning a knob connected to the light 14 or by a touch sensitive sensor). Each light 14 may be turned on and off as desired, such as by touching each light 14 (e.g., on a touch-sensitive sensor), by adjusting a knob or buttons provided on each light 14, and/or by operating a control panel (e.g., on a remote control, on a mobile device, etc.) (not shown).

Figure 4A:
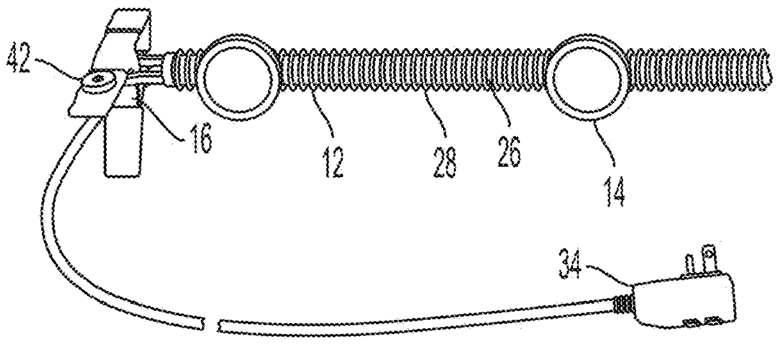
FIG. 4A is a side view showing a first plug for the adjustable work light of FIG. 1.
Figure 4B:
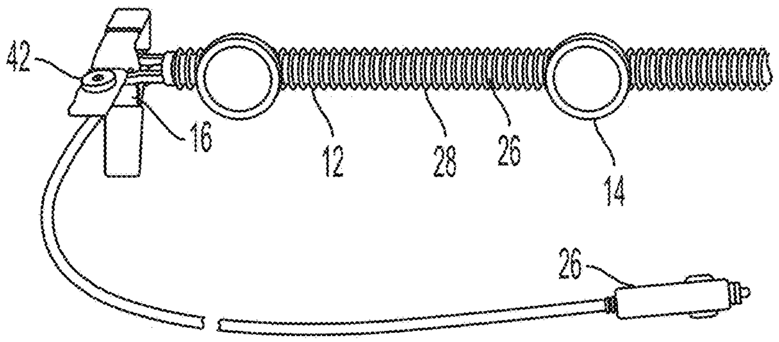
FIG. 4B is a side view showing a second plug for the adjustable work light of FIG. 1.
Figure 4C:
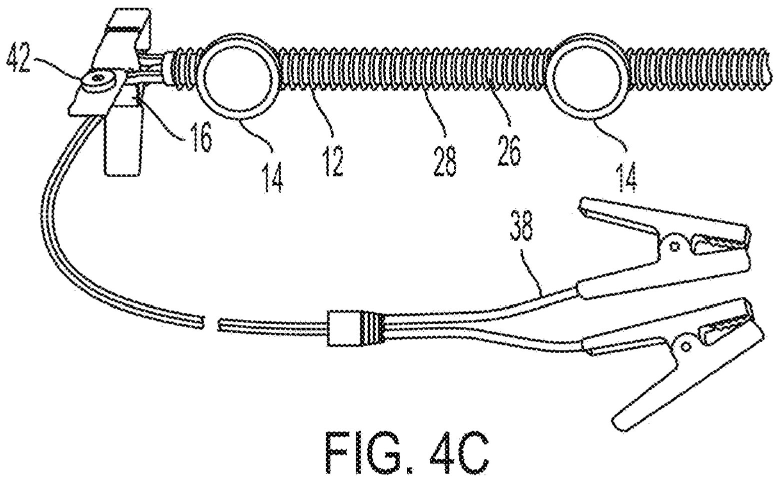
FIG. 4C is a side view showing a third plug for the adjustable work light of FIG. 1.
Figure 4D:
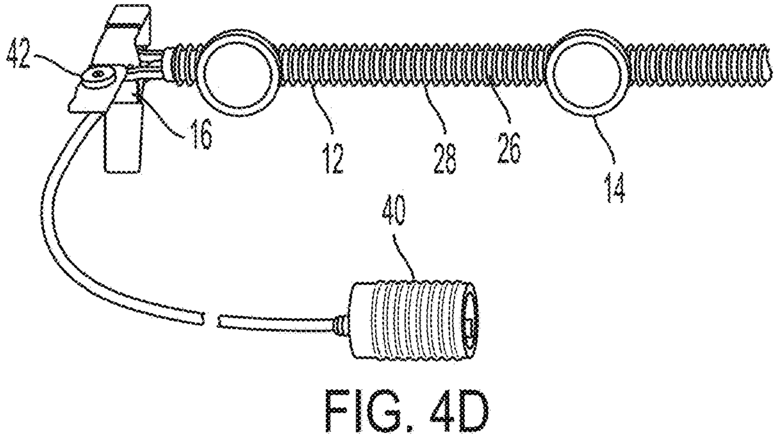
FIG. 4D is a side view showing a fourth plug for the adjustable work light of FIG. 1.

In some non-limiting embodiments, power cord 20 may supply power to lights 14. As discussed above, power cord 20 extends through hollow interior 24 of flexible support 12. As shown in FIG. 3, power cord 20 may include an extension 32 that branches from main cord 20 and extends through flexible support 12 to connect with light 14. Although only one example of this extension 32 is shown in FIG. 3, it is understood that an extension 32 may be provided for each light 14. Power cord 20 may include plug 22 at one end, so that power can be provided from an outside source (e.g., a power outlet, a generator, an electrical port in an automobile, a car battery, etc.) (not shown) to the lights 14. A standard wall plug 22 is shown in FIGS. 1-2C, 5, and 6, but other examples are shown in FIGS. 4A-4D. For example, FIG. 4A shows a plug with a ground fault interrupter circuit 34 to be used in instances where the work light 10 is to be used in damp areas. FIG. 4B shows a cigarette lighter supply plug 26 (e.g., an auxiliary direct-current port plug) that can be plugged into cigarette lighters (e.g., auxiliary electrical power outlets) provided in various automobiles. FIG. 4C shows a pair of clamps 38 that can be connected to a battery terminal (e.g., of an automobile battery) (not shown) and a piece of grounding metal (e.g., the engine frame of an automobile) (not shown). Clamps 38 may be used in connection with a car battery B or another battery, like that used with an all-terrain vehicle. FIG. 4D shows plug 40 for use with a universal 12-volt direct current rechargeable battery socket that is present in many portable tool lines.

Referring now to FIGS. 1-2C, 5, and 6, depicted are non-limiting embodiments or aspects of attachment mechanisms 16 of work light 10. Attachment mechanisms 16 are shown as clamps and are attached at opposing ends of flexible support 12. Attachment mechanisms 16 may connect to any graspable feature present in the work environment (e.g., edges of a work bench, stationary tools or supports, nearby equipment, the item being worked on, etc.) to arrange the flexible support 12 and lights 14 in a desired manner. The clamps 16 may include rubber or other grounding features in the instance they are connected to metal features in the work environment, so as to prevent short-circuits. As shown, one clamp may be arranged so that power cord 20 extends between two of the clamping elements. It may be desirable to avoid repeatedly clamping power cord 20 during operation of the attachment mechanisms. Attachment mechanisms 16 may also include magnets 42 to connect work light 10 to different ferromagnetic materials located within the work space (e.g., metal tools, stationary supports, nearby equipment, the item being worked, etc.). Attachment mechanism 18 is a hook located centrally relative to the length of flexible support 12 to provide additional support to flexible support 12 and lights 14. While a hook is shown, attachment mechanism 18 may be another type of fastener (e.g., clamp, magnet, etc.) extending from flexible support 12 to provide desired support. The position of attachment mechanism 18 may also be fixed or adjustable in another position along support 12, so that attachment mechanism 18 may be located closer to one of the other attachment mechanisms 16, rather than being centrally located along flexible support 12.

With specific reference to FIGS. 5 and 6, depicted are non-limiting embodiments or aspects of adjustable work light 10 applied to different work environments. FIG. 5 shows work light 10 within a wheel well W of a motor vehicle V, and FIG. 6 shows work light 10 applied to the underside of a motor vehicle hood H. Although both examples are related to an automotive work space, one will appreciate the different applications and uses of work light 10 beyond such an environment. In FIG. 5, flexible support 12 is arranged in a semi-circle shape, with attachment mechanisms 16 clipped to an outer boundary OB of wheel well W. This allows the lights 14 to be angled into well W and toward the ground, illuminating all of wheel well W. In FIG. 5, flexible support 12 extends in a substantially straight line across the underside of hood H, with magnets 42 of the attachment mechanisms 16 being used to support flexible support 12. Power cord 20 also extends below to battery B, so that clamps 38 can draw power from battery B and provide it for lights 14.

Although the disclosure has been described in detail for the purpose of illustration based on what is currently considered to be the most practical and non-limiting embodiments or aspects, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. An adjustable work light comprising:

a support tube having a length;

a plurality of lights secured along the length; and at least one attachment mechanism connected to the support tube, the at least one attachment mechanism configured to arrange the support tube in a desired position, wherein the support tube is adjustable along the length, wherein at least one feature of each light of the plurality of lights is individually adjustable, the at least one feature including at least one of focus, intensity, or angle, and wherein each of the plurality of lights are secured to the support tube, such that each of the plurality of lights are rotatable and fixable about the support tube, whereby each of the plurality of lights are configured to be securable between a plurality of positions around the support tube.

2. The adjustable work light of claim 1, wherein the support tube is bendable at a plurality of points along the length.

3. The adjustable work light of claim 2, wherein the support tube is configured to be repeatedly bendable at the plurality of points along the length.

4. The adjustable work light of claim 1, wherein the plurality of lights are secured to and positioned on or in a surface of the support tube.

5. The adjustable work light of claim 1, wherein the plurality of lights are configured to extend a distance away from the support tube.

6. The adjustable work light of claim 1, wherein a brightness of the plurality of lights is adjustable.

7. The adjustable work light of claim 1, wherein the at least one attachment mechanism comprises a first attachment mechanism located at a first end of the support and a second attachment mechanism located at a second end of the support tube, opposite the first end.

8. The adjustable work light of claim 7, wherein the at least one attachment mechanism comprises a third attachment mechanism located between the first attachment mechanism and the second attachment mechanism.

9. The adjustable work light of claim 7, wherein the first attachment mechanism and the second attachment mechanism are clamps.

10. The adjustable work light of claim 8, wherein the third attachment mechanism is a hook.

11. The adjustable work light of claim 1, wherein the support tube comprises a hollow interior.

12. The adjustable work light of claim 11, wherein the adjustable work light further comprises a power cord extending through the hollow interior and configured to provide power to the plurality of lights.

13. The adjustable work light of claim 12, wherein the power cord comprises a plug end configured to draw power from an outside source.

14. The adjustable work light of claim 11, wherein the support tube comprises a body defining the hollow interior and a plurality of rings extending from the body equidistant along the length, and wherein the body is configured to bend between each of the plurality of rings.

15. The adjustable work light of claim 11, wherein the plurality of lights are received within the support tube.

16. The adjustable work light claim 15, wherein the support tube comprises a plurality of portions, each portion corresponding to one of the plurality of work lights, and wherein each of the plurality of portions of the tube are configured to bend relative to the other plurality of portions.

17. An adjustable work light comprising:

a flexible support tube;

a plurality of lights secured along a length of the flexible support tube;

a first attachment mechanism arranged at a first end of the flexible support tube; and a second attachment mechanism arranged at a second end of the flexible support tube, opposite the first end, wherein the length of the flexible support tube is adjustable along a plurality of points, wherein the plurality of lights are individually adjustable relative to the flexible support tube and each of the other plurality of lights, and wherein each of the plurality of lights are secured to the flexible support tube, such that each of the plurality of lights are rotatable and fixable about the flexible support tube, whereby each of the plurality of lights are configured to be securable between a plurality of positions around the flexible support tube.

18. The adjustable work light of claim 17, wherein the flexible support tube defines a hollow interior configured to receive a power cord therein, the power cord being configured to provide power from an outside source to the plurality of lights.

19. The adjustable work light of claim 17, further comprising a third attachment mechanism between the first attachment mechanism and the second attachment mechanism.

20. The adjustable work light of claim 17, wherein the flexible support tube comprises corrugated stainless steel tubing.

* * * * *